Figure 1:
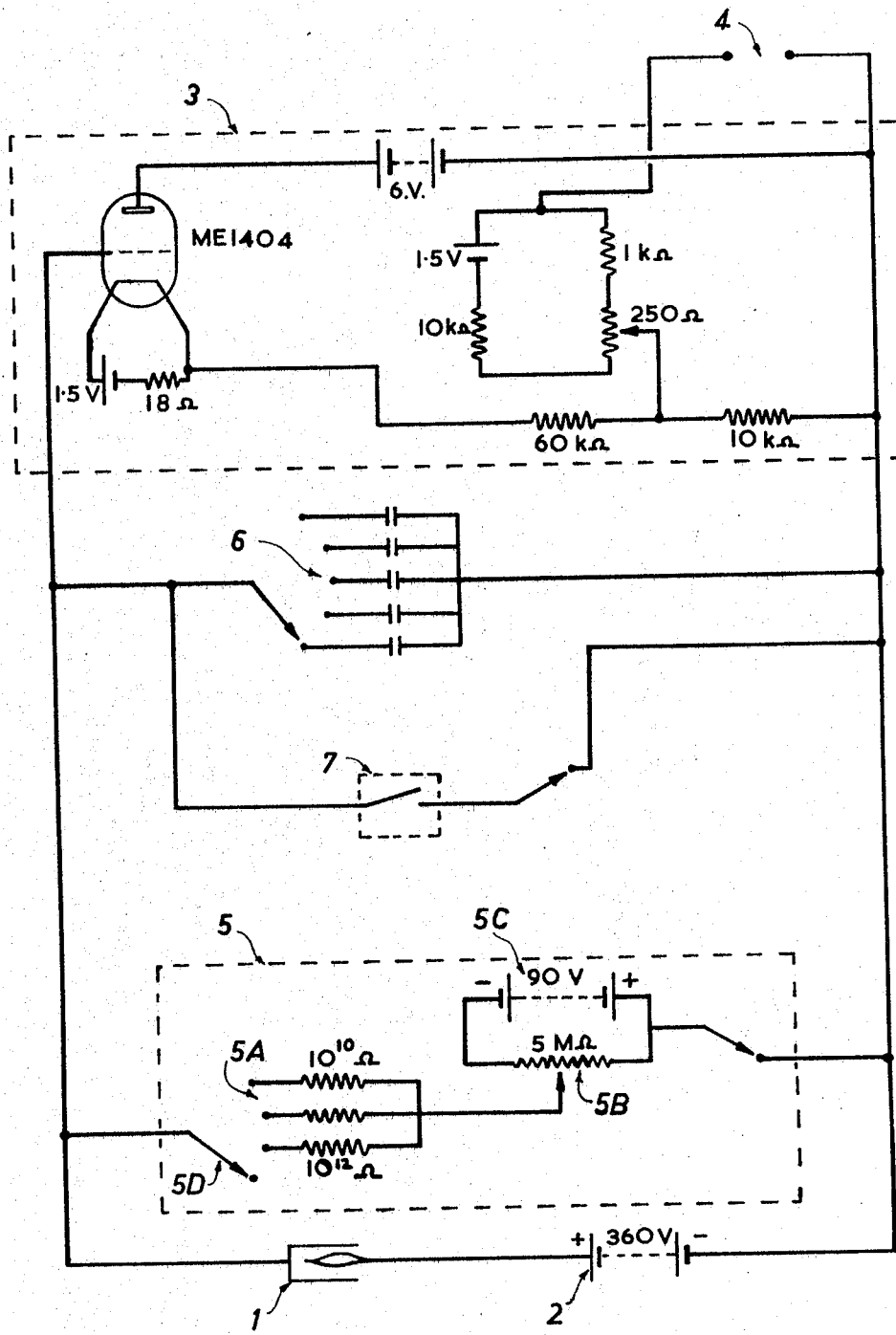

United States Patent Office 3,298,788
Patented Jan. 17, 1967

3,298,788
IONISATION DETECTOR CIRCUIT
Robert Alfred Dewar, Ashburton South, and Volker Elmar Maier, Hampton, Australia, assignors to Imperial Chemical Industries of Australia and New Zealand Limited, Melbourne, Victoria, Australia, a company of Victoria, Australia
Filed July 13, 1964, Ser. No. 382,102
Claims priority, application Australia, Aug. 14, 1963, 34,202/63
7 Claims. (Cl. 23—232)

This invention relates to ionisation detectors which are suitable for detection of organic substances e.g. in vapour phase chromatography; in particular it relates to a simple circuit for the integration of signals from ionisation detectors.

A circuit for the integration of the output of ionisation detectors providing for the compensation of background has been published by Grinten and Dijkstra (van der Grinten and A. Dijkstra, Nature, 191, 1195, 1961). The circuit described in the above reference operates to produce an integrating effect in an indirect manner. Instead of using the conventional battery or mains-operated source of steady high voltage to maintain the ion current when a signal appears at the detector, van der Grinten et al. use a condenser charged to a suitable high potential and draw the ion current from the charge on this condenser, the voltage of which in consequence decreases proportionally to the current drawn from it. By measuring the decrease in the voltage of the condenser an indication of the integrated signal is obtained. Since, however, there is a background ion current which it is not desired to integrate, additional provision must be made to cancel the effect of the background current, and this additional provision is made by means of an auxiliary compensating circuit. This compensation is only useful in the integrating mode and not in conventional differential presentations.

We have now found that with certain types of ionisation detectors and particularly with the hydrogen flame ionisation detector, integration can be obtained directly with very little modification of the conventional differential circuitry, which employs a high value resistor in the input and measures the instantaneous voltage developed across it. This integration is obtained by replacing the usual resistor by a condenser and measuring by otherwise identical circuitry the voltage developed across this condenser as ion current is accumulated on it.

Accordingly, the present invention provides a circuit for the detection of organic matter by the flame ionisation technique comprising: firstly, a flame ionisation detector known "per se"; secondly, a primary source of electrical energy having a potential suitable for the flame ionisation detector; thirdly, an electrometer suitable for the amplification of signals from said flame ionisation detector and characterised in that it has a high input resistance; fourthly, a recorder suitable for and connected to the output of said electrometer; fifthly, a condenser connected across the input to said electrometer where the condenser capacitance is selected from the range from 0.001 to 100 microfarads and the above mentioned input resistance of said electrometer is chosen to be so high as to minimise leakage of charges from said condenser through said electrometer; sixthly, a by-pass switch connected across said condenser and capable of being closed for a fraction of a second either directly by the recorder or by indirect circuit closing means such as a relay activated by the recorder or by indirect circuit closing means such as a relay activated by the recorder at a preselected point of the recorder pen excursion; and seventhly, also connected across the input to said electrometer, a compensator comprising a variable resistor having a resistance selected from the range from $10^{12}$ to $10^8$ ohms and a source of electrical potential selected from the range from 5 to 500 v. in such a manner that the current produced from said compensator and opposing the signal current can be adjusted to the magnitude of the background current to be compensated for. A suitable high input resistance for the electrometer has a resistance greater than $10^{11}$ ohms. Said circuit permits the integration of those signals from the flame ionisation detector which are due to the substances to be measured while it eliminates the undesired background.

Flame ionisation detectors suitable for use in our invention are now widely known and used. The essential parts of detectors and combinations with additional apparatus to which our invention is applicable are described e.g. in United States patent specification No. 3,039,856, claims 8, 9, 11 and 12 and United States patent specification No. 2,991,158 claims 1, 8, 9, 11, 15, 17 and 18. These patents disclose the combination of a flame ionisation detector with a separating column, specifically a gas chromatographic column. Other variants of these detectors to which our invention is applicable will be apparent to those skilled in the art.

Compared with the elaborate and expensive electrical or electromechanical integrators commonly used our integrator is a simple, inexpensive yet accurate and reliable device. Compared with van der Grinten's et al. condenser device cited above, our invention has the advantage of using a background compensatory device which is advantageous in the normal differential mode as well, and also in the logarithmic mode provided in our co-pending application Serial No. 382,101 filed on July 13, 1964.

It is not obvious that so simple a device as that provided in our invention would operate as a useful integrator and indeed those skilled only in electronics engineering would seem disposed to reject the concept as inoperable; although they would recognise a condenser as an inherently integrating type of device they would not consider it suitable for direct current integration in a simple circuit since normally the accumulated charge would leak away through the current source when the signal decreases; furthermore, in most cases the developed voltage would itself reduce the current flowing into the condenser and thus give a false result. We have now appreciated that with ionisation detectors and particularly with the flame ionisation detector, these objections to the use of a condenser as a direct current integrating device in a simple circuit do not apply. In using a condenser in conjunction with the flame ionisation detector the first difficulty—the expectation that the accumulated charge will leak away through the source—is overcome by our proposed apparatus because the ion current is collected at the detector by applying across it a voltage always much higher (e.g. about 500 times higher) than the voltage developed on the condenser for integrating purposes; consequently the ion current through the detector cannot flow in the reverse direction through the detector under the influence of the developed voltage of the condenser and any charge accumulated is thus conserved. In addition we have realised and our apparatus is based on the realisation that the nature of the signal current is that of a saturation current determined solely by the amount of detectable substance presented to the detector and quite independent, because of the very large excess detection voltage employed, of the small back voltage developed from the condenser. Thus, in using the condenser in conjunction with a flame ionisation detector we have overcome the second difficulty with and objection to the use of condensers as integrating means for small currents.

Our integrating circuit is used in conjunction with a recording device in the output of the electrometer, and since the signals are cumulative provision must be made for the case where the total signal is greater than can be accommodated on a single width of the recorder chart. This is done by causing the recording mechanism to automatically and momentarily short the integrating condenser when the recording device reaches full-scale. The recording pen then moves back towards the baseline, but signal charge is not lost (except during the brief moment of shorting) since charge is still being accumulated on the condenser, and the recording pen then resumes its upscale movement at the point corresponding to the charge accumulated during its downscale movement. The shorting operation may be done directly by means of a switch actuated by the recorder, or indirectly e.g. by means of a relay; the latter arrangement is convenient since it avoids high impedance lines to the recorder.

Our integrating condenser must have a high quality dielectric (e.g. polystyrene) since low quality dielectrics retain charge on momentary shorting.

A preferred embodiment of this invention is illustrated by the practical example thereof shown in the schematic circuit diagram of FIG. 1 in which 1 represents the flame ionisation detector, 2 the primary source of electrical energy, 3 the electrometer, including a triode Mullard ME1404, 4 a recorder, 5 a compensator comprising a variable resistance 5A selected from $10^{12}$, $10^{11}$ and $10^{10}$ ohms in series with a slide-wire resistance 5B variable from 0 to $5.10^6$ ohms, a secondary source of electric energy 5C opposed in sign to the background current from the detector 1 and a switch 5D, and a condenser 6 of 10 microfarad capacitance which, by means of a switch, may be interchanged with any one of a series of capacitances in the range from 10 to 0.001 microfarad and a switch 7 activated by the recorder pen at full amplitude by means of a relay not shown.

In practical operation the resistances of the compensator are adjusted to cancel the background; the recorder 4 then draws a straight line parallel to the time axis, in the no signal condition. The appearance of a signal current is then followed by a pen traverse up-scale. At the top end of the scale switch 7 is momentarily and automatically operated by means of a relay, not shown, thus discharging the condenser. The recorder returns towards zero, and re-commences its up-scale traverse at a point corresponding to the charge accumulated during the time taken in the reverse travel. No charge is lost due to the time elapsed during the pen reversal, the only loss of charge occurring being that which corresponds to the signal current flowing during the instant when the shorting switch is closed. This normally is a negligible amount. The total integral is given by the sum of the up-scale excursions measured from the zero line to full scale (irrespective of the lower points actually reached by the pen), allowing of course for the initial and final pen positions at the beginning and end of the signal.

The compensator for background current referred to above and useful in conjunction with devices giving linear differential presentation in its simplest form is known from the prior art; it consists of a high resistance in series with a variable voltage course, connected and adjusted in such a manner that the base-line ion current is drawn off and returned to ground. Thus the potential across the electrometer input is reduced to zero, and the values of the measuring resistors can be changed without affecting the base-line reading on the output indicating or recording instrument. The compensator in this simple form is useable with our integrating device when relatively large condensers are used in lieu of resistors but when small condensers are used (i.e. for working at high sensitivity) some of the signal current is lost through the compensator when the signal voltage is added to the compensator voltage, thus causing a leakage of current in excess of the background current and proportional to the signal voltage at any given moment. The result of this leakage is a downward drift in the output indication of the integrated signal, and the error is then cumulative with time. We have found that this undesirable effect can be avoided by a modification to the simple form of the compensator, by providing a voltage feedback from the output of the electrometer or recorder equal to the signal voltage at the input, and subtracting this feedback from the compensator voltage in the compensator circuit. In this manner the effective voltage in the compensator circuit remains the same at all times as in the base-line condition, and the ion current drawn through the compensator resistor remains equal to the background ion current only. It follows that signal currents cannot leak away through the compensator and the above-mentioned drift does not occur. A corrected compensator is thus provided.

Accordingly, in a preferred form of the compensator we provide a corrected compensation circuit in which the leakage of signal current is prevented by feeding back a voltage from the output equal to the signal voltage and subtracting this feedback from the compensator voltage.

In a preferred form of the feedback arrangement the feedback voltage is provided by a re-transmitting slide-wire (and associated voltage source and rheostat) on the recorder used for recording the signals.

Figure 2:
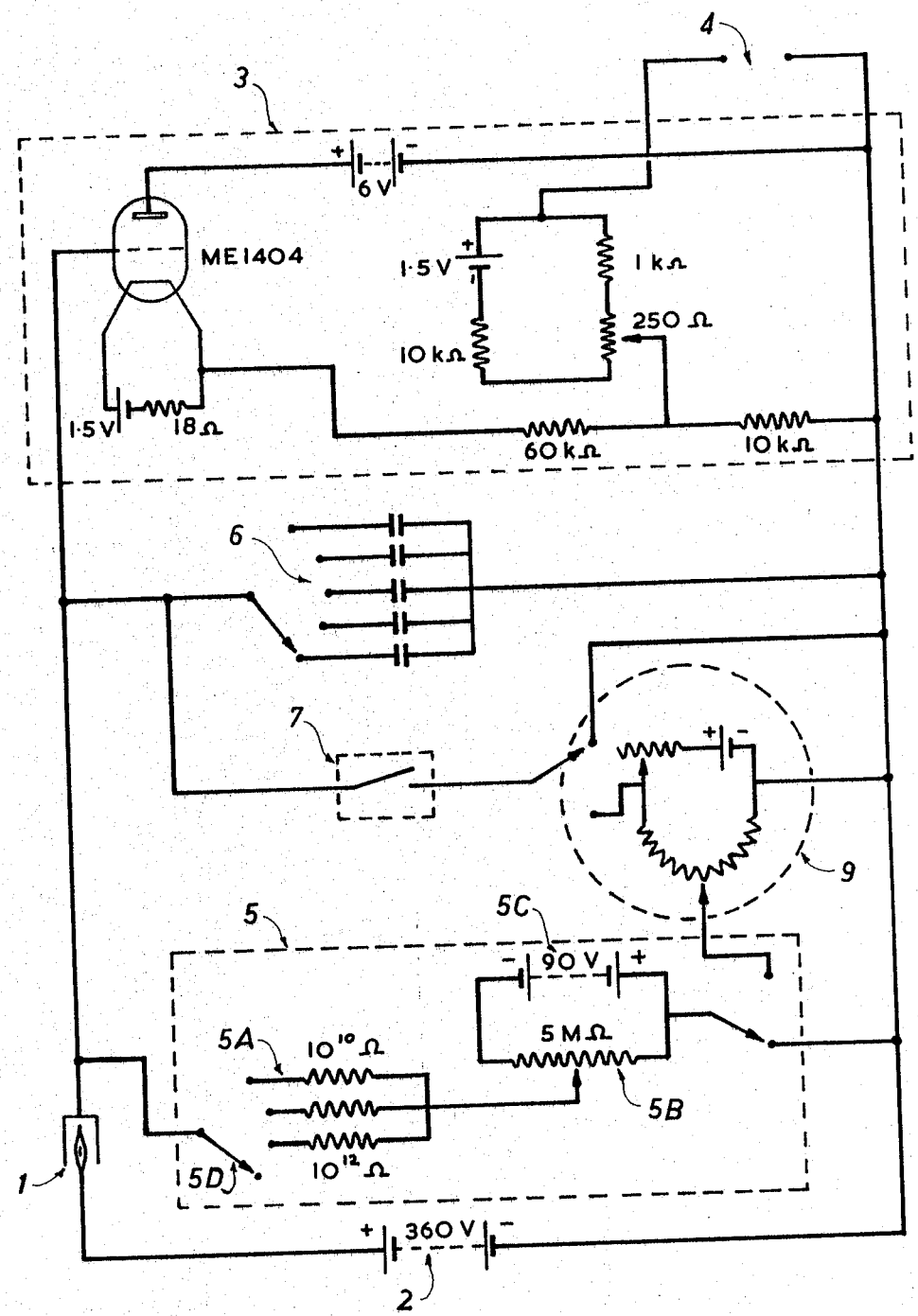

A practical example of the invention is shown in FIG. 2 which is a schematic circuit diagram.

The flame detector 1 and voltage source 2 are connected to a conventional electrometer circuit 3 (which may be replaced by any other suitable high impedance electrometer) feeding into a recorder connected at 4. A simple compensator circuit is provided at 5 with variable voltage source and a range of suitable high resistors. In addition a feedback circuit actuated by the recorder is provided at 9 which may optionally be switched into use in conjunction with the compensator circuit. A range of condensers 6 is provided for the integrating operation, and a switch 7 actuated directly or indirectly by the recorder for shorting the condenser in use.

Figure 3:
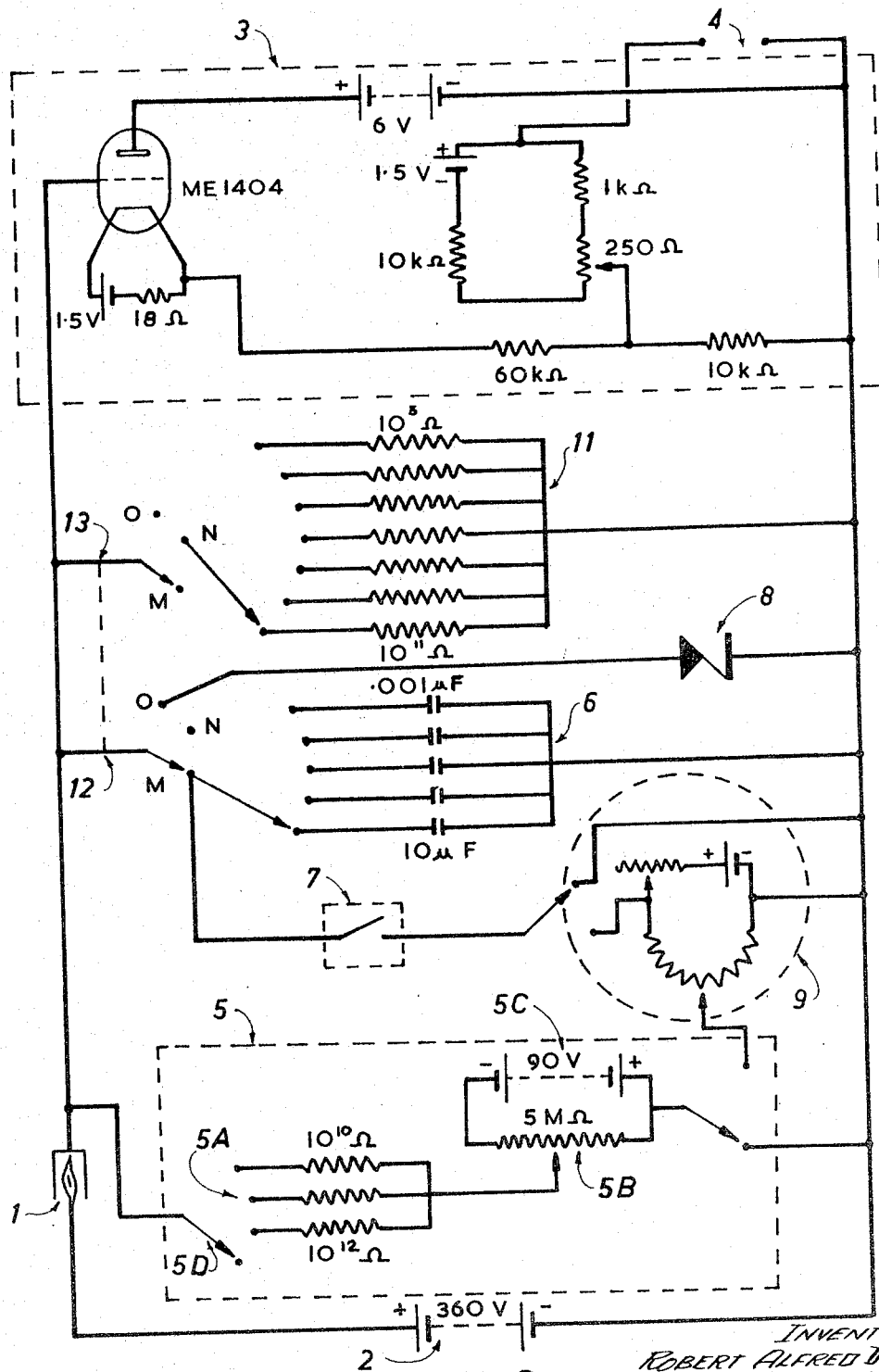

It is apparent, and this is a further advantage of the present invention, that the integrator and corrected compensator circuits can be used in a single circuit, combining these with the known linear differential circuit and the logarithmic circuit of our co-pending application Serial No. 382,101 filed on July 13, 1964, as exemplified in the schematic circuit diagram of FIG. 3 which shows how each of three modes of operation can be conveniently and instantly selected by simple switching operations.

In FIG. 3, items 1 to 7 are as in FIG. 1, item 8 is a semi-conductor diode passing 10 microamp in the forward direction at an applied voltage of 0.55 v., namely an "Intermetall Z10" diode as also described in our copending application Serial No. 382,101 filed on July 13, 1964 and item 9 is the feedback arrangement of FIG. 2, item 11 is a high resistance selected from a series of interchangeable resistances and items 12 and 13 are the coupled switches for selection of the circuits to items 6 and 11 respectively. Operation of the logarithmic response, linear response or integrating circuit may then be selected by means of the coupled switches 12 and 13 in positions O, N and M respectively.

The devices according to this invention can find very broad application in gas chromatographic analysis, gas analysis and for the monitoring and automatic control of gas effluent from industrial processes.

We claim:
1. Apparatus for measuring organic substance by flame ionisation technique in integrating presentation comprising, in combination, firstly, a flame ionisation detector, secondly, a primary source of electrical energy having a potential suitable for the flame ionisation detector; thirdly, an electrometer suitable for the amplification of signals from said flame ionisation detector and characterised in that it has a high input resistance; fourthly, a recorder suitable for and connected to the output of said electrometer; fifthly, a condenser connected across the input to said electrometer where the condenser capacitance is selected from the range from 0.001 to 100 microfarads and the above-mentioned input resistance of said electrometer is chosen to be so high as to minimise leakage of charges from said condenser through said electrometer; sixthly, a by-pass switch connected across said condenser and capable of being closed for a fraction of a second by circuit closing means activated by the recorder at a preselected point of the recorder pen excursion; and seventhly, also connected across the input to said electrometer, a compensator comprising a variable resistor having a resistance selected from the range from $10^{12}$ to $10^8$ ohms and a source of electrical potential selected from the range from 5 to 500 v. in such a manner that the current produced from said compensator and opposing the signal current can be adjusted to the magnitude of the background current to be compensated for.

2. Apparatus including the combination of a separating column for providing an effluent comprising constituents of the organic substance to be analysed and an inert carrier gas with apparatus according to claim 1, said separating column having means connecting it to the flame ionisation detector for purposes of conducting the effluent from the separating column to the flame ionisation detector.

3. Apparatus according to claim 2 where the separating column is a gas chromatographic column.

4. Apparatus according to claim 1 where the circuit closing means is an electrical relay.

5. Apparatus according to claim 1 where the input resistance of the electrometer is equal to or greater than $10^{11}$ ohms.

6. Apparatus according to claim 1 comprising in addition a feedback circuit connected to the voltage output of the flame ionisation detector and the compensator and feeding back a voltage equal to the signal voltage and opposing said voltage to the compensator voltage.

7. Apparatus according to claim 6 in which the feedback voltage is derived from a re-transmitting slide-wire in combination with a voltage source and rheostat.

References Cited by the Examiner

UNITED STATES PATENTS

| | | | |
|---|---|---|---|
| 2,423,617 | 7/1947 | Rath | 324—99 X |
| 2,615,063 | 10/1952 | Brown | 324—111 |
| 2,991,158 | 7/1961 | Harley | 23—232 |
| 3,140,919 | 7/1964 | Gallaway et al. | 23—232 |

MORRIS O. WOLK, *Primary Examiner.*

R. M. REESE, *Assistant Examiner.*